(12) United States Patent
Halberstadt

(10) Patent No.: US 11,054,851 B2
(45) Date of Patent: Jul. 6, 2021

(54) POWER FACTOR CORRECTION WITH ACTIVE DAMPING

(71) Applicant: NXP B.V., Eindhoven (NL)

(72) Inventor: Hans Halberstadt, Groesbeek (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/511,595

(22) Filed: Jul. 15, 2019

(65) Prior Publication Data

US 2021/0018948 A1 Jan. 21, 2021

(51) Int. Cl.
*H02M 1/42* (2007.01)
*G05F 1/70* (2006.01)
*H02M 1/44* (2007.01)

(52) U.S. Cl.
CPC ............ *G05F 1/70* (2013.01); *H02M 1/4208* (2013.01); *H02M 1/44* (2013.01)

(58) Field of Classification Search
CPC ....................... G05F 1/70; G05F 1/565; H02M 1/42–2001/4291
See application file for complete search history.

(56) References Cited

U.S. PATENT DOCUMENTS

| | | | |
|---|---|---|---|
| 5,530,396 A | 6/1996 | Vlatkovic et al. | |
| 9,270,159 B2 | 2/2016 | Shen et al. | |
| 2005/0270813 A1* | 12/2005 | Zhang | H02M 1/4225 363/89 |
| 2013/0201731 A1* | 8/2013 | Gu | H02M 3/33507 363/21.17 |
| 2015/0042227 A1* | 2/2015 | Kumar | H05B 33/0815 315/85 |
| 2016/0118897 A1* | 4/2016 | Soares | H02M 3/33507 363/21.12 |
| 2016/0248365 A1* | 8/2016 | Ishizeki | H02M 1/36 |
| 2019/0305671 A1* | 10/2019 | Matsuura | H02M 1/083 |
| 2019/0326810 A1* | 10/2019 | Hashimoto | H02M 1/4233 |

* cited by examiner

*Primary Examiner* — Peter M Novak

(57) ABSTRACT

Various embodiments relate to a circuit for power factor correction ("PFC"), the circuit including: a mains filter and rectifier configured to generate an input voltage for power factor correction and transmit the input voltage to a PFC controller and a load block; a voltage regulator configured to regulate the input voltage and output a control signal to an adder; a mains voltage sensor configured to sense a mains voltage and output a sensed mains voltage; a bandpass filter configured to filter out frequencies in a range of resonance frequencies of the sensed mains voltage and output an additional signal; and an adder configured to add the additional signal to the control signal and output a desired input current to the PFC controller.

12 Claims, 3 Drawing Sheets

POWER FACTOR CORRECTION WITH ACTIVE DAMPING

TECHNICAL FIELD

This disclosure relates generally to power factor correction, and more specifically, but not exclusively, to making an active damping resistance for damping resonance in an EMI filter while the power is not dissipated in the damping resistance.

SUMMARY OF EXEMPLARY EMBODIMENTS

A brief summary of various embodiments is presented below. Embodiments address the need to create a power factor correction with active damping.

In order to overcome these and other shortcomings of the prior art and in light of the need to create a power factor correction with active damping, a brief summary of various exemplary embodiments is presented. Some simplifications and omissions may be made in the following summary, which is intended to highlight and introduce some aspects of the various exemplary embodiments, but not to limit the scope of the invention.

Detailed descriptions of a preferred exemplary embodiment adequate to allow those of ordinary skill in the art to make and use the inventive concepts will follow in later sections.

Various embodiments relate to a circuit for power factor correction ("PFC"), the circuit including: a mains filter and rectifier configured to generate an input voltage for power factor correction and transmit the input voltage to a PFC controller and a load block; a voltage regulator configured to regulate the output voltage and output a control signal to an adder; a mains voltage sensor configured to sense a mains voltage and output a sensed mains voltage; a bandpass filter configured to filter out frequencies in a range of resonance frequencies of the sensed mains voltage and output an additional signal; and an adder configured to add the additional signal to the control signal and output a desired input current to the PFC controller.

Various embodiments are described, wherein the control signal sets a momentary input current level.

Various embodiments are described, wherein the voltage regulator verifies that the momentary input current level is proportional to the input voltage.

Various embodiments are described, wherein the additional signal provides active damping.

Various embodiments are described, wherein the sensing of the main voltage is at the input the mainsfilter and rectifier.

Various embodiments are described, wherein the sensing of the main voltage is at the output of the mainsfilter and rectifier.

Various embodiments are described, wherein a PFC stage includes transmitting power from the input voltage to the load.

Further various embodiments relate to a method for power factor correction ("PFC"), the method including the steps of: generating, by a mains filter and rectifier, an input voltage for a power factor correction and transmitting power from the input voltage to a PFC controller and a load block; regulating, by a voltage regulator, the input voltage and outputting a control signal to an adder; sensing, by a mains voltage sensor, a mains voltage; filtering out, by a bandpass filter, frequencies in a range of resonance frequencies and outputting an additional signal; and adding, by an adder, the additional signal to the control signal and outputting a desired input current to the PFC controller.

Various embodiments are described, wherein the control signal sets a momentary input current level.

Various embodiments are described, wherein the voltage regulator verifies that the momentary input current level is proportional to the input voltage.

Various embodiments are described, wherein the additional signal provides active damping.

Various embodiments are described, wherein the sensing of the main voltage is at the input of the mainsfilter and rectifier.

Various embodiments are described, wherein the sensing of the main voltage is at the output of the mainsfilter and rectifier generating an input voltage for a power factor correction and transmitting power from the input voltage to the PFC and load block.

Various embodiments are described, wherein a PFC stage includes transmitting power from the input voltage to the load.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

These and other more detailed and specific features are more fully disclosed in the following specification, reference being had to the accompanying drawings, in which.

DETAILED DESCRIPTION OF THE INVENTION

Figure 1:
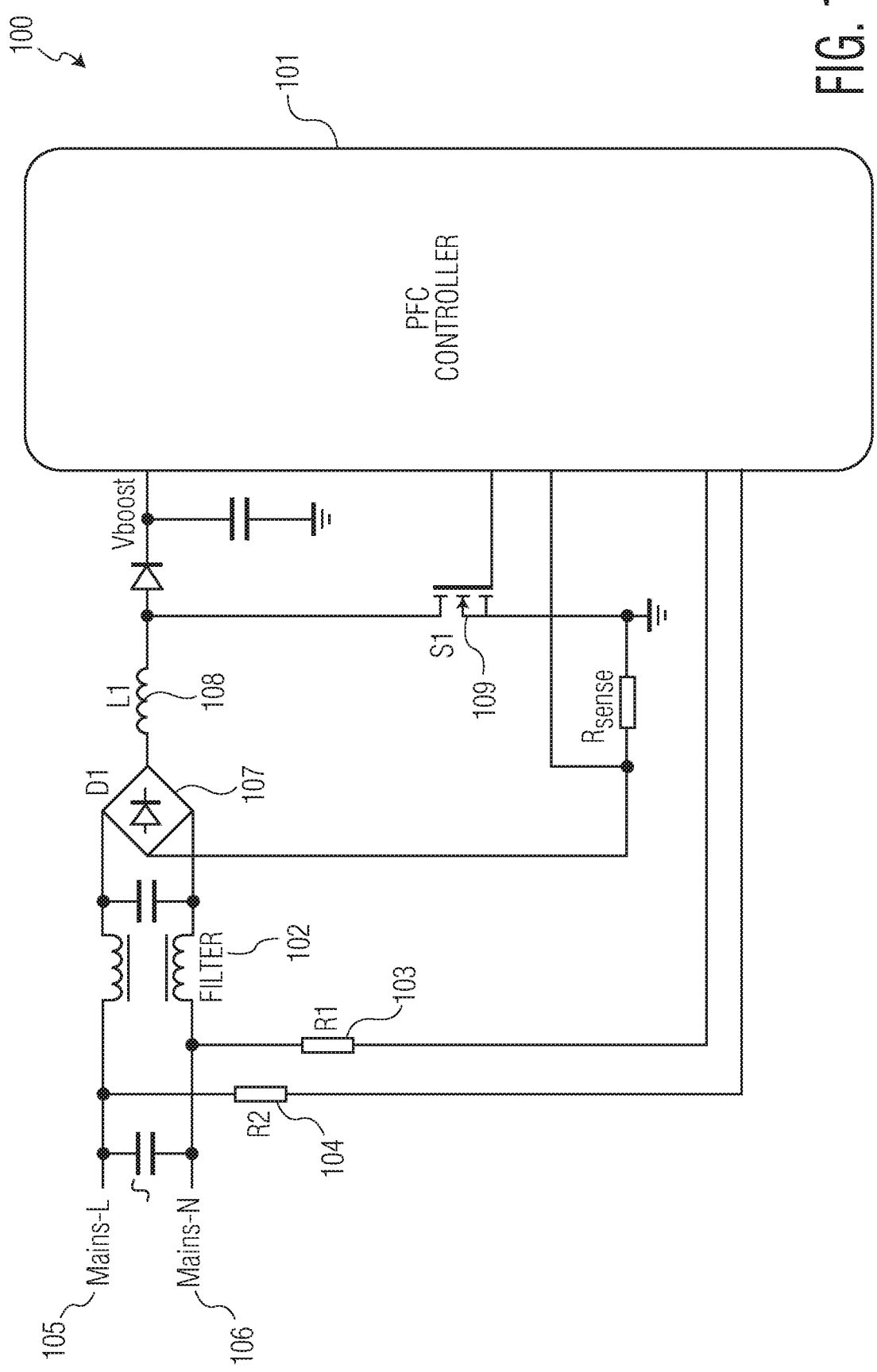
FIG. 1 illustrates circuit diagram a basic converter stage.

It should be understood that the figures are merely schematic and are not drawn to scale. It should also be understood that the same reference numerals are used throughout the figures to indicate the same or similar parts.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. Descriptors such as "first," "second," "third," etc., are not meant to limit the order of elements discussed, are used to distinguish one element from the next, and are generally interchangeable.

Power factor correction ("PFC") is required for switched mode power supply ("SMPS") with power levels above 75 watts, however, for SMPS with power levels above 300 watts, continuous-conduction mode ("CCM") operation may be used as using a CCM operation uses a smaller EMI filter.

PFC uses a fixed frequency in a CCM operation. Close to the mains zero crossings CCM operation may not be maintained, and when it cannot be maintained, changeover to a boundary conduction mode ("BCM") or discontinuous conduction mode ("DCM") operation may occur with rising frequency and therefore has a lower efficiency close to the zero crossings of the mains.

Therefore, to produce a high power factor and low total harmonic distortion ("THD") requires that the input current, Iin drawn by the PFC, be proportional to the momentary mains voltage, which is represented by defining a factor k2, where:

$$Iin = k2 \cdot Vmains$$

$$Pin = Vmains \cdot Iin$$

$$Pin = Vmains \cdot (k2 \cdot Vmains)$$

$$Pin = Vmains^2 \cdot k2$$

Therefore, the momentary input current equals the momentary mains voltage times a factor of k2 and the momentary input power is proportional to the square of the momentary input voltage. For the average power, Pin_av (k2, Vmainspeak) over a mains half cycle, the average value, pin_av of the power is half of the peak value, Vmainspeak of the square of a sinewave:

$$Pin\_av(k2, Vmainspeak) = \frac{Vmainspeak^2}{2} \cdot k2$$

Therefore, because the k2 value is fixed, the power level is proportional to the square of the mains voltage amplitude, Vmainspeak and the gain of the closed loop is proportional to the square of the mains voltage amplitude, Vmainspeak.

However, it may be necessary to have a fixed gain of the total control loop because constant gain prevents a shift of the 0 db loop gain frequency of the closed loop and therefore, a dynamic response is possible for universal mains voltage while maintaining stability of the loop.

The k2 value includes a mains voltage compensation by $1/Vmains^2$ which makes the gain from the control to the output power compensated for by mains voltage amplitude.

By making the desired input current proportional to the mains voltage, dynamic behavior may occur which may cause undesired resonances in the mains filter.

FIG. 1 illustrates circuit diagram 100 of a basic converter stage of the PFC controller 101 including the mains filter 102.

The circuit diagram 100 includes mains voltage, mains-L 105 and mains-N 106, a resistor R1 103 and a resistor R2 104, a mains filter 102, a bridge diode 107, an inductor 108 and a switch 109.

The basic converter stage of the PFC controller 101 includes the mains filter 102. The mains filter 102 is required for electromagnetic interference suppression ("EMI") suppression and resistor R1 103 and resistor R2 104 are used to sense the momentary mains voltage, mains-L 105 and mains-N 106.

Due to the inductor-capacitor, LC structure of the mains filter 102, resonance may create a variation of the PFC controller 101 input voltage or a variation in the sensed input voltage. In combination with a fast algorithm that is used to regulate the input current to a desired input current, the resonances may become unstable.

The current embodiment prevents instabilities due to resonances in the mains filter and without the prevention of instabilities, the desired input current may not be achieved. In the current embodiment, the PFC 101 may operate in a DCM or CCM operation where an input current is defined in relation to the momentary mains voltage to meet a required specification for power factor correction and total harmonic distortion ("THD") and for generating an additional input current for the PFC 101 that is in phase with detected resonances at the PFC 101 input voltage.

The mains voltage, mains-L 105 and mains-N 106 are in-puts where the PFC takes the power from. Due to the switching sequence. high frequency components are injected into the mains. In order to fulfill the requirements for mains pollution, additional filtering is needed. Therefore, a filter 102 is added that includes two coupled inductances that behave as common mode and differential mode filter. The capacitors before and after the filter also contribute to the filtering. Rectifier 107 produces the required DC voltage as input for the actual PFC switching cell (108,109) converting energy from the inlets mains-L 105 and mains-N 106 via a diode to an output voltage Vboost. The PFC controller 101 sets the timing of S1.

Figure 2:
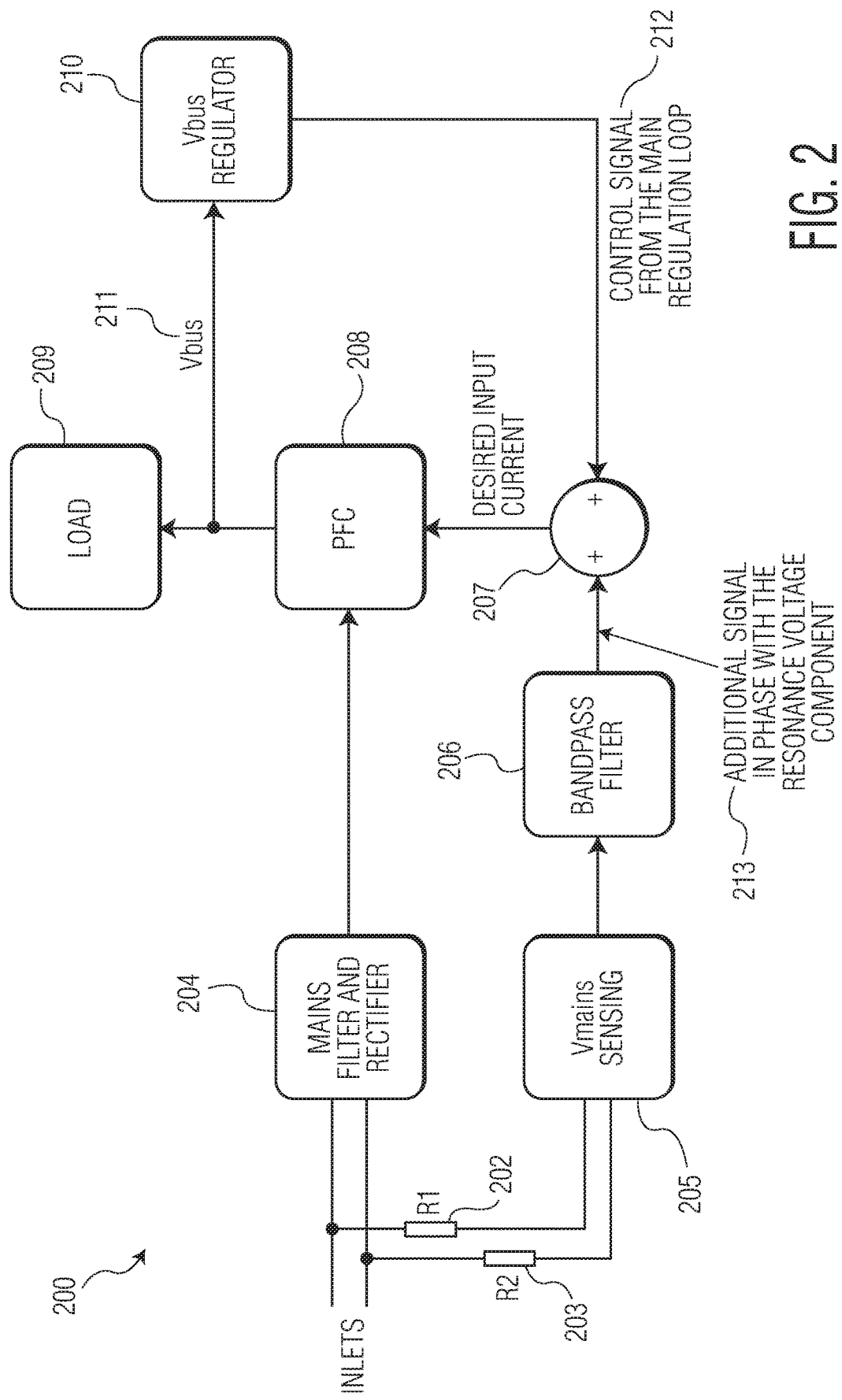
FIG. 2 illustrates a circuit diagram for degeneration resistors of the current embodiment.

FIG. 2 illustrates a circuit diagram 200 for degeneration resistors of the current embodiment.

The circuit diagram includes inlets 201, resistor R1 202, resistor R2 203, the mains filter and rectifier 204, Vmains sensing 205, a bandpass filter 206, an adder 207, a PFC 208, load 209 and Vbus regulator 210.

The mains filter and rectifier 204 stage generates the input voltage for the PFC 208 stage. The PFC 208 stage delivers power to the load 209 at a voltage Vbus 211.

Vbus 211 is regulated to the desired value by a Vbus regulator 210. The Vbus regulator 210 delivers a control signal 212 back to the PFC 208 where the control signal 212 sets the momentary input current level. The Vbus regulator 210 confirms that the momentary input current is proportional to the mains voltage, such that a current is drawn proportional to the mains voltage, which gives the required resistive behavior needed for a high power factor. The additional signal 213 provides the active damping which is the output from the mains sensing block 205 which is followed by the bandpass filter 206. The bandpass filter 206 only passes the frequency components from the sensed mains voltage that are caused by resonances in the mains-filter. As the sensing resistors 202, 203 are sensing the voltage referred to the controller ground, half of the resonating component is sensed by the sensing resistors. By adding the signal 213 (representing the resonance component only) to the desired input current, the PFC makes an additional input current component being proportional to the signal 213. Effectively this behaves as an active resistor, damping the resonance, however the energy taken from the resonance is not dissipated, but converted to the output.

Figure 3:
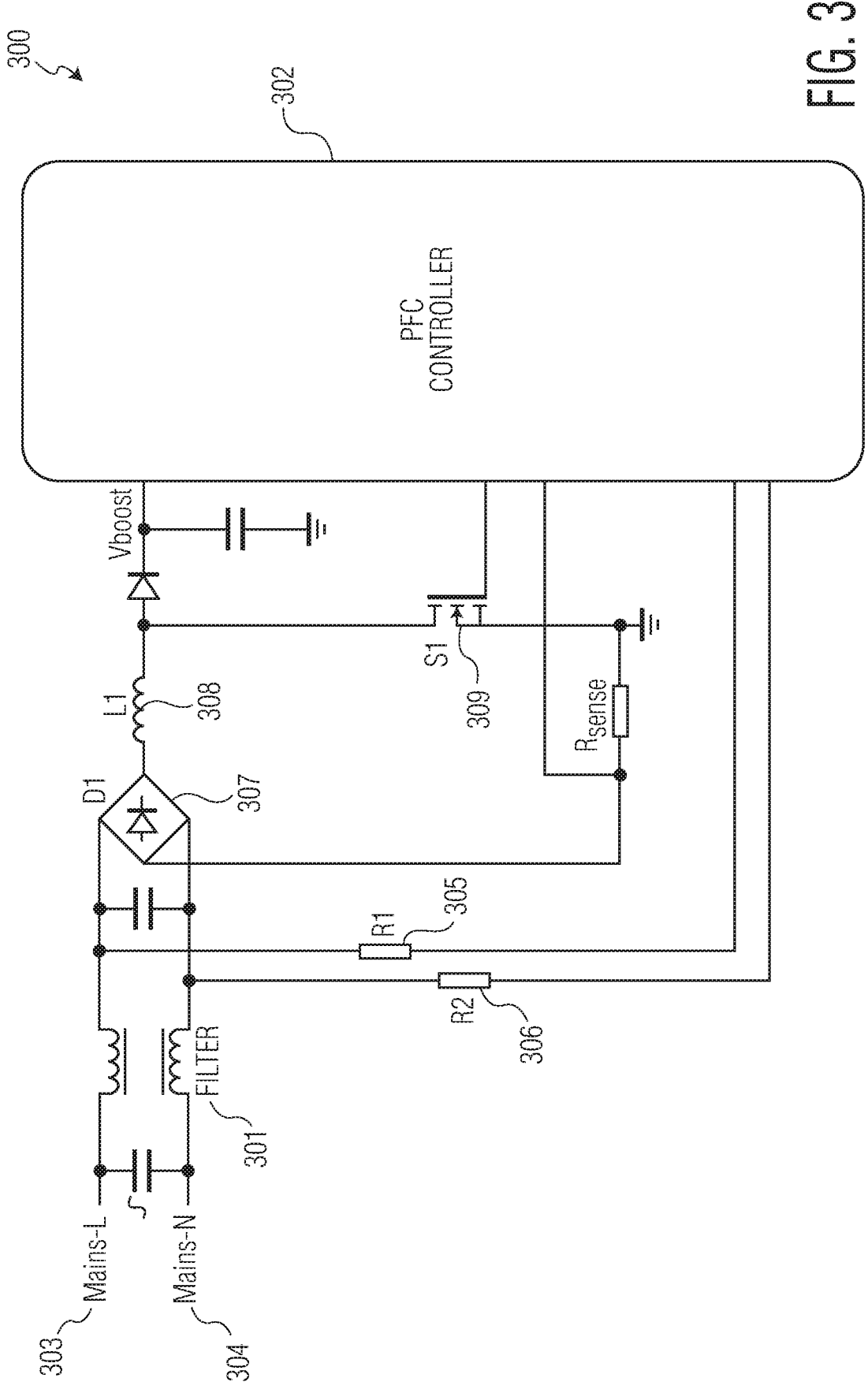
FIG. 3 illustrates a circuit diagram of Vmains sensing behind the mains filter of the current embodiment.

FIG. 3 illustrates a circuit diagram 300 of Vmains sensing behind the mains filter of the current embodiment.

The circuit diagram 300 includes mains voltage, mains-L 303 and mains-N 304, a mains filter 301, a resistor R1 305 and a resistor R2 306, a diode bridge 307, an inductor 308 and a switch 309.

The current embodiment is directed towards sensing before and after the mains filter 301.

The current embodiment may be applied in applications (for example, gaming or PC desktops with higher power) such as power supplies with power levels exceeding approximately 300 watts including different load ranges, where PFC 301 function is required and where THD requirements hold.

In another embodiment, it is possible to sense the mainsvoltage via a sense resistor between the output of the diode bridge 307 and the inductor 308.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A non-transitory machine-readable storage medium may include any mechanism for storing information in a form readable by a machine, such as a personal or laptop computer, a server, or other computing device. Thus, a non-transitory machine-readable storage medium may include read-only memory (ROM), random-access memory (RAM), magnetic disk storage media, optical storage media, flash-memory devices, and similar storage media and excludes transitory signals.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Accordingly, it is to be understood that the above description is intended to be illustrative and not restrictive. Many embodiments and applications other than the examples provided would be apparent upon reading the above description. The scope should be determined, not with reference to the above description or Abstract below, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A circuit for power factor correction ("PFC"), the circuit comprising:
   a mains filter and rectifier configured to generate an input voltage for power factor correction and transmit the input voltage to a PFC controller and a load block, wherein a PFC stage is configured to deliver power from the input voltage to the load at a $V_{bus}$;
   a voltage bus regulator configured to regulate the voltage output on the $V_{bus}$ by the PFC controller and output a control signal to an adder;
   a mains voltage sensor configured to sense a mains voltage and output a sensed mains voltage;
   a bandpass filter configured to filter out frequencies in a range of resonance frequencies of the sensed mains voltage and output an additional signal; and
   an adder configured to add the additional signal to the control signal and output a desired input current to the PFC controller.

2. The circuit for power factor correction of claim 1, wherein the control signal sets a momentary input current level.

3. The circuit for power factor correction of claim 2, wherein the voltage regulator is further configured to verify that the momentary input current level is proportional to the input voltage.

4. The circuit for power factor correction of claim 1, wherein the additional signal provides active damping.

5. The circuit for power factor correction of claim 1, wherein a pair of resistors are coupled to an input of the mains filter.

6. The circuit for power factor correction of claim 1, wherein a pair of resistors are coupled to an output of the mains filter.

7. A method for power factor correction ("PFC"), the method comprising:
   generating, by a mains filter and rectifier, an input voltage for a power factor correction and transmitting power from the input voltage to a PFC controller and a load block, wherein a PFC stage is configured to deliver power from the input voltage to the load at a $V_{bus}$;
   regulating, by a voltage bus regulator, voltage output on the $V_{bus}$ by the PFC controller and outputting a control signal to an adder;
   sensing, by a mains voltage sensor, a mains voltage;
   filtering out, by a bandpass filter, frequencies in a range of resonance frequencies and outputting an additional signal; and
   adding, by an adder, the additional signal to the control signal and outputting a desired input current to the PFC controller.

8. The method for power factor correction of claim 7, wherein the control signal sets a momentary input current level.

9. The method for power factor correction of claim 8, further comprising: verifying, with the voltage regulator, that the momentary input current level is proportional to the input voltage.

10. The method for power factor correction of claim 7, wherein the additional signal provides active damping.

11. The method for power factor correction of claim 7, wherein a pair of resistors are coupled to an input of the mains filter.

12. The method for power factor correction of claim 7, wherein a pair of resistors are coupled to an output of the mains filter.

\* \* \* \* \*